United States Patent [19]

Fockens

[11] Patent Number: 5,070,328
[45] Date of Patent: Dec. 3, 1991

[54] METHOD OF CHECKING THE LOADING AND UNLOADING OF TANKERS BY MEANS OF AN ELECTROMAGNETIC IDENTIFICATION SYSTEM, AND AN IDENTIFICATION SYSTEM FOR USE IN SAID METHOD

[75] Inventor: Tallienco W. H. Fockens, Eibergen, Netherlands

[73] Assignee: N.V. Nederlandsche Apparatenfabriek, De Groenlo, Netherlands

[21] Appl. No.: 622,189

[22] Filed: Dec. 5, 1990

Related U.S. Application Data

[63] Continuation-in-part of Ser. No. 462,318, Dec. 26, 1989, abandoned, which is a continuation of Ser. No. 87,801, Aug. 21, 1987, abandoned.

[30] Foreign Application Priority Data

Aug. 25, 1986 [NL] Netherlands ..................... 8602148

[51] Int. Cl.$^5$ ............................................. H04Q 1/00
[52] U.S. Cl. ................................................ 340/825.54
[58] Field of Search ............ 340/825.31, 825.54, 825.55, 310 R, 310 A, 533, 870.02, 870.03; 361/212, 215, 216, 217; 222/23, 42, 132; 141/18, 94, 104, 231, 387; 128/200.19; 137/554, 265, 256

[56] References Cited

U.S. PATENT DOCUMENTS

| | | | |
|---|---|---|---|
| 1,564,855 | 12/1925 | Jurs | 361/215 |
| 1,600,549 | 9/1926 | Jurs | 361/215 |
| 2,385,673 | 9/1945 | Woodworth | 340/310 R |
| 3,337,992 | 8/1967 | Tolson | 340/533 |
| 4,075,675 | 2/1978 | Burkett et al. | 340/310 R X |
| 4,196,418 | 4/1980 | Kip et al. | . |
| 4,254,402 | 3/1981 | Perkins | 340/310 R |
| 4,333,072 | 6/1982 | Beigel | . |
| 4,345,146 | 8/1982 | Story et al. | . |
| 4,473,825 | 9/1984 | Walton | 340/825.54 |

FOREIGN PATENT DOCUMENTS

2221395 11/1974 France .

*Primary Examiner*—Ulysses Weldon
*Attorney, Agent, or Firm*—Fleit, Jacobson, Cohn, Price, Holman & Stern

[57] ABSTRACT

A system for checking the loading and unloading of a tanker having at least one tank provided with a metal connecting pipe adapted to be coupled via a coupling to one end of a hose having a coupling at two ends, which hose can be coupled to a metal connecting pipe of a storage tank. The hose used is provided with an electric conductor extending between the couplings for the dissipation of electrostatic charges and the chassis of the tanker is grounded. A first inductive coupling is effected between one of the connecting pipes and an interrogator of an electromagnetic identification system, and a second inductive coupling is effected between the other connecting pipe and a passive responder generating a coded signal in an interrogation field. Thus an interrogation field formed by the interrogator cooperates via the first inductive coupling, the one connecting pipe, the electric conductor of the hose, the other connecting pipe, and the second inductive coupling with the responder. The code of the responder is checked prior to loading or unloading.

5 Claims, 3 Drawing Sheets

METHOD OF CHECKING THE LOADING AND UNLOADING OF TANKERS BY MEANS OF AN ELECTROMAGNETIC IDENTIFICATION SYSTEM, AND AN IDENTIFICATION SYSTEM FOR USE IN SAID METHOD

This application is a continuation-in-part of application Ser. No. 07/462,318, filed Dec. 26, 1989, now abandoned, which is a continuation of application Ser. No. 07/087/801, filed Aug. 21, 1987, now abandoned.

BACKGROUND OF THE INVENTION

This invention relates to a method of checking the loading and unloading of a tanker having at least one tank provided with a metal connecting pipe adapted to be coupled via a coupling to one end of a hose having a coupling at two ends, which hose can be coupled to a metal connecting pipe of a storage tank.

In loading and unloading tankers, and in particular those having several compartments, which may or may not be filled or discharged through one and the same stub, it is of importance that, prior to loading or unloading, it is clearly established with which storage tank the tanker is connected via the hose. Furthermore, it is of importance that the correct compartment of the tanker is connected to a given storage tank.

As the filling of a tank or tank compartment of a tanker or a storage tank with a material not intended for that tank or that compartment may have very detrimental results, there is a need for a possibility of automatically checking whether the hose is connected to the correct storage tank and, possibly, to the correct compartment of the tanker during the loading and unloading of tankers.

The data that should be automatically collected concerns the question which compartment of the tanker is filled with which substance. Substance means in this connection fuels, such as petrol, dieseloil, etc., but also other liquids, or even powdered materials, which can be loaded and unloaded through a hose. The question which compartment is being filled or discharged, is answered by the position of the valves, which connect the stub to the compartments. This position of the valves can be read electromagnetically and subsequently supplied to the processor section of an electronic reader unit. The question with which material the compartment concerned is being filled is determined by the answer to the question to which storage tank the stub is connected through the hose. The stubs of the storage tanks are arranged next to each other, so that a choice must be made between a plurality of stubs for connecting the hose.

SUMMARY OF THE INVENTION

It is an object of the present invention to satisfy the need outlined above. For this purpose there is provided a method of the kind described, which is characterized by using a hose provided with an electric conductor extending between the couplings for the dissipation of electrostatic charges; grounding the chassis of the tanker; effecting a first inductive coupling between one of the connecting pipes and an interrogator of an electromagnetic identification system, and effecting a second inductive coupling between the other connecting pipe and a passive responder generating a code signal in an interrogation field, so that an interrogation field formed by the interrogator cooperates via said first inductive coupling, said one connecting pipe, said electric conductor of the hose, said other connecting pipe, and said second inductive coupling with said responder; and checking the code of the responder prior to loading or unloading.

The invention also provides an identification system for the application of the method, which system is characterized by a first connecting pipe connected to at least one first tank, and at least one second connecting pipe connected to at least one other tank, which connecting pipes can be connected together by means of couplings and a hose provided with an electric conductor; and by an interrogator inductively coupled to said first connecting pipe and a passive responder inductively coupled with each second connecting pipe, said responder generating a code signal identifying the connecting pipe in question under the influence of an interrogation field generated by the interrogator, which signal can be detected by the interrogator.

BRIEF DESCRIPTION OF THE DRAWING

The invention is illustrated in and by the following description, with reference to the accompanying drawings. In said drawings.

DETAILED DESCRIPTION OF THE PREFERRED EMBODIMENT

Figure 1A:
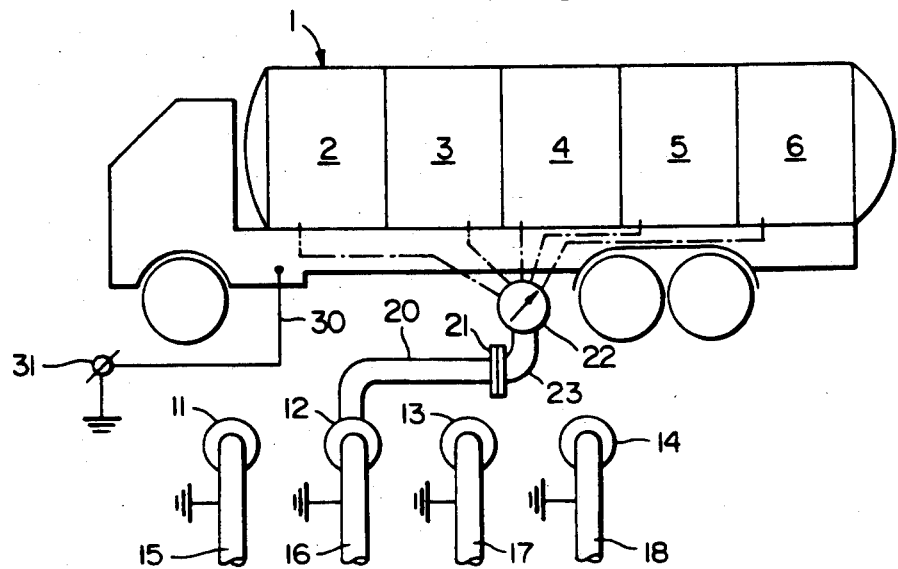
FIG. 1A illustrates a situation in which the present invention can be applied.
Figure 1B:
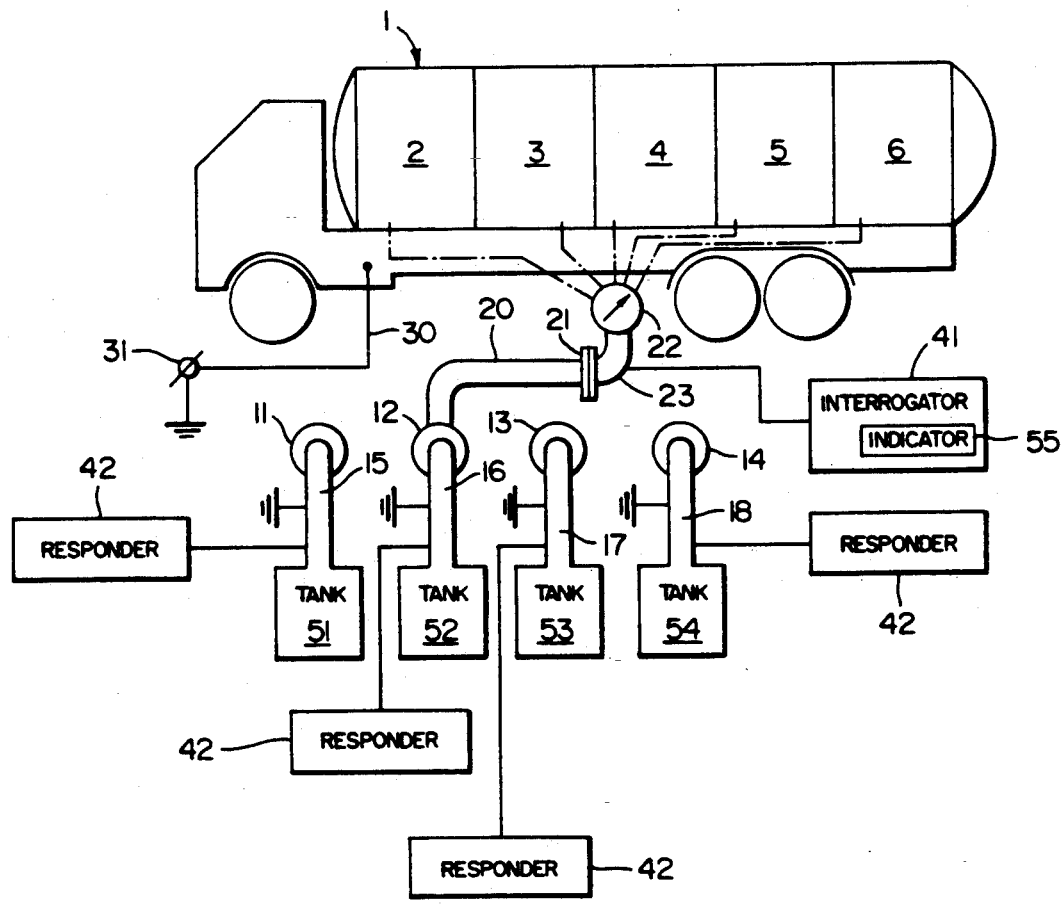
FIG. 1B illustrates the application of the present invention in the situation of FIG. 1A.

FIGS. 1A and 1B show a tank lorry 1 having compartments 2-6, which by means of pipes, shown in dot-dash lines are connected to a valve system 22 having a connecting pipe for stub 23 which is provided with a coupling 21 for a hose 20.

There are further shown a plurality of drain connections 11-14 of supply storage tanks 51-54. Naturally, the drain connections can also be used as filling connections, depending on whether the tanker is used to fill the storage tank(s), or to be filled from the storage tank(s). Furthermore, the tanker vehicle may have a single compartment, i.e., a tank not sub-divided in two compartments. The following description will be given on the basis of a tanker having a plurality of compartments, and further being provided with the interrogator 41 of an electromagnetic identification system, which further comprises a plurality of responders 42, sometimes referred to as electronic labels, which in response to an electromagnetic interrogation field of a suitable frequency generate a coded signal which can be recognized by the interrogator 41 or by a separate detector and indicated to a user at the interrogator so it can be determined that the correct storage tank 51-54 is hooked up to the correct compartment of the truck. The compartment of the tanker which is connected to the hose is displayed on a gauge 55 on the tanker vehicle.

The responders 42 are preferably of the passive type, i.e., that they withdraw the energy required for their operation fully from the interrogation field.

A suitable responder is described, for example, in U.S. Pat. No. 4,196,418 to Kip et al.

In order to identify the drain connections with which a storage tank is connected by the hose 20 each drain connection should be electronically labeled by a responder in such a manner that its label is read at the drain connection to which the hose 20 is connected and indicated at the interrogator. The coupling between the interrogator and the electronic label should therefore be brought about via the hose. One obvious solution is a twin-wire connection, which is fastened along the hose and connected to a coil at opposite ends. These coils are positioned in the vicinity of the couplings at the ends of the hose, so that these coils couple magnetically with a cell connected to the interrogator placed adjacent to the filling connection on the tanker, and with a coil of the electronic label placed adjacent to the drain connection selected.

In this manner of coupling, the hose must be provided with the twin-wire line and with the coils, which in practice is undesirable, because it requires adapting all hoses. In addition, the hoses would become quite vulnerable and apt to become mechanically damaged from rough handling.

The hose 20 has an electric conductor intended to dissipate electrostatic charges, so that the coupling for the filling connection is electrically connected to the coupling for the drain connection 11-14. There is also an electrical connection 30 between the vehicle chassis of the tanker and a ground connection 31 of the filling installation, designed to dissipate electrostatic charges on the tanker. As the drain connections are also grounded, this connection forms a second conductor between the tanker and the drain connection selected.

Figure 4:
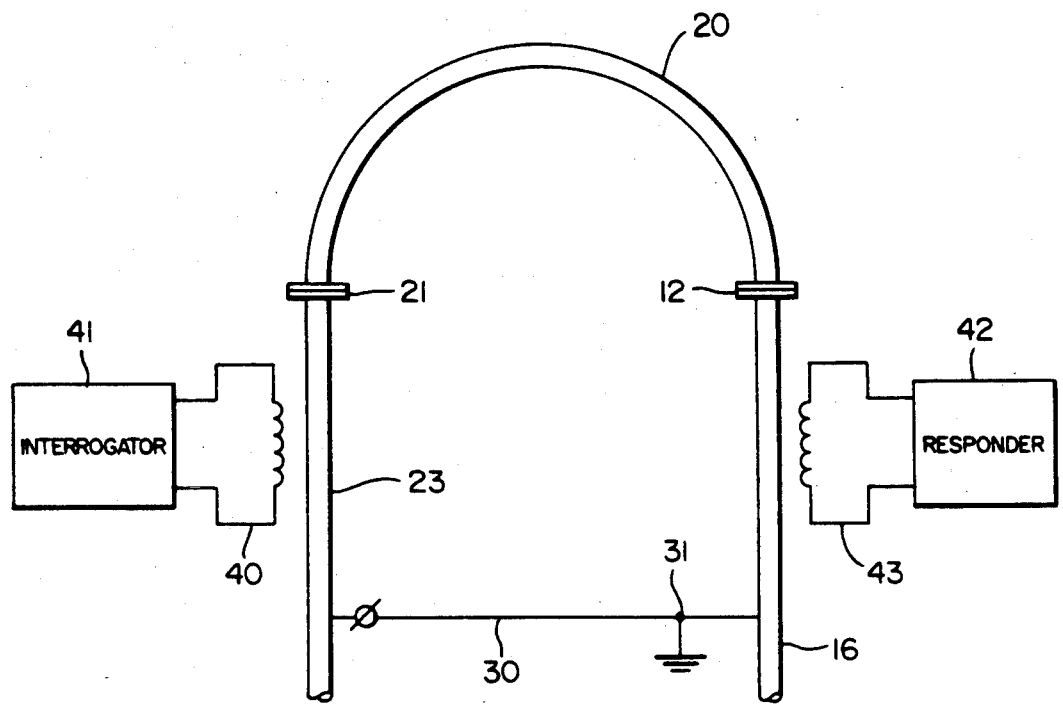
FIG. 4 shows a diagram of the electrical circuit of one embodiment of a system according to the present invention.
Figure 5:
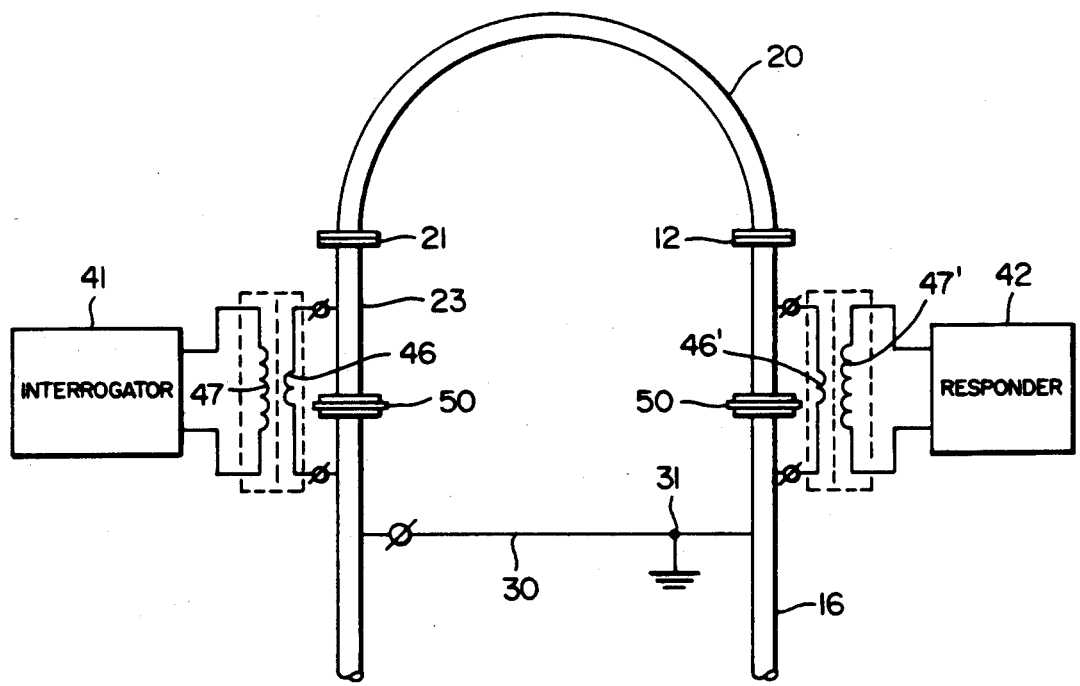
FIG. 5 shows a variant of FIG. 4.

Together with the electric conductor of the hose, the grounding thus forms a closed loop when the hose is connected to one of the plurality of storage tanks 51-54. This closed loop can be used for the purposes of the present invention for the coupling between the interrogator and the label. The tanker is grounded via ground wire 30 and ground connector 31 as shown in FIGS. 1A, 4 and 5.

For the coupling of the interrogator 41 and the electronic labeling responder 42 (see FIGS. 3 and 4) with the closed loop, two solutions are possible. The first solution consists in a toroidal coil 40 placed around the connecting pipe 23 of the filling connection, or the connecting pipes 15-18 of the drain connections of the filling installation as shown in FIG. 1A.

Figure 2:
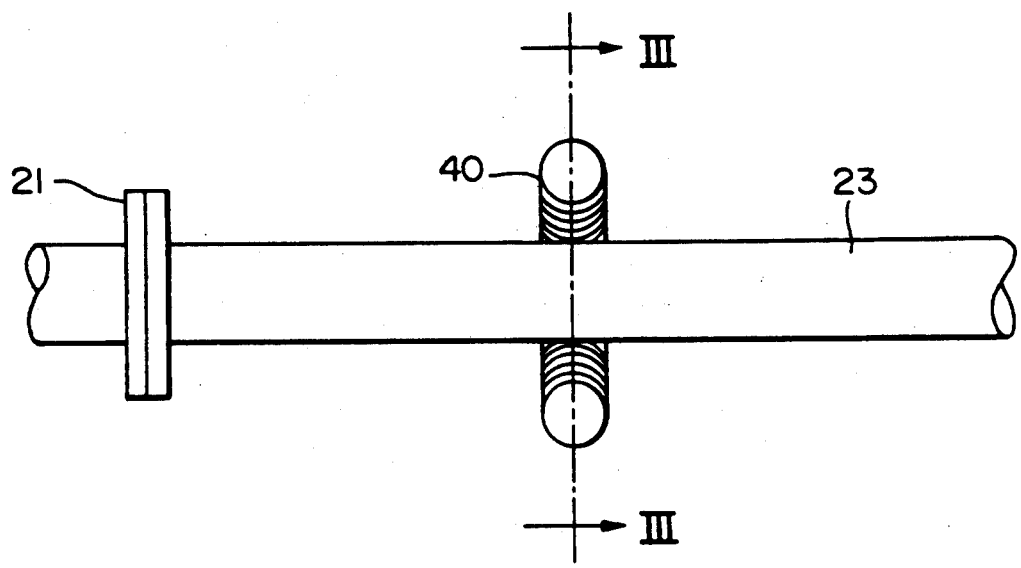
FIG. 2 shows an example of an inductive coupling between a connecting pipe and a part of an identification system.
Figure 3:
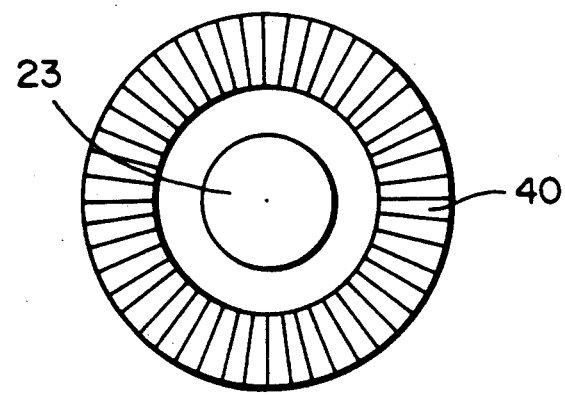
FIG. 3 shows a cross-sectional view, taken on the line III—III of FIG. 2.

Such a toroidal coil 40 is shown in FIG. 2, and a cross-sectional view of the coil is shown in FIG. 3. Coil 40 is placed around pipe 23. Pipes 15, 16, 17 and 18 are similarly provided with a toroidal coil, unless the inductive coupling mode of a second solution shown in FIG. 5 is used.

The toroidal coil 40 connected to the interrogator 41 is in fact a winding of a current transformer, which induces a voltage in the pipe enclosed by the coil. This induction voltage results in a current in a loop formed by 23, 20, 30. The current also flows through the pipe 16 of one of the drain connections 12 connected to the hose 20 as shown in FIG. 4. Around this pipe there is also provided a toroidal coil 43 forming part of responder 42. In coil 43, a voltage is induced by the current in the loop. In this manner the interrogation field generated by the interrogator 41 can reach the responders via the electrical circuit, as described above, even if the responders are relatively remote from the interrogator.

In the reverse direction, the information signal is transmitted from the labeling responder 42 to the interrogator 41. In this solution, nothing needs to be changed about the pipes of the filling and drain connection. It is only necessary to mount the toroid, constructively built up from two half rings, around the pipes.

In the first solution aforementioned, a problem may occur, if the closed loop is so extensive that the coupling becomes too weak to let the identification system function properly. In that case, a stronger coupling is required between the interrogator and the labeling responder and the closed loop, respectively. In the second solution, the pipe is electrically interrupted adjacent to the filling and drain connections 23 and 12 by means of an insulating packing 50, see FIG. 5. Such electrical interruptions are bridged by windings 46, 46', consisting of some turns of thick wire. For DC current and low-frequency currents, this winding still forms a through-connection, so that the safety requirements regarding the dissipation of electrostatic charges are still complied with. The winding is wound, for example, on a ring core, with a second winding 47, 47', consisting of many more turns than the first winding, being tuned by means of a capacitor to the operating frequency of the identification system, for example, 120 kHz.

In the electronic labeling responder 42, the second winding 47' forms part of the tuned circuit, and on the side of the interrogator 41, the second winding 47 is connected to the transmission/receiving terminal of the interrogator.

It will be clear to any one skilled in the art that it is also possible to use a combination of the two methods of coupling, i.e., one method employing the toroidal coil direct on the pipe, and the other with the electrically interrupted pipe and the separate transformer, by using one method on the tanker, and the other for the electronic labeling transponders at the drain connections.

The above description is based on identification of the drain connection during loading of the tanker. During the unloading of the tanker, an identical identification problem occurs, in the sense that it must be automatically verified that the correct material contained in a certain compartment of the tanker is discharged into the correct storage tank. For this purpose the tank connection to which the hose is connected from the tanker must again be identified. The tank connection is then also provided with an electronic labeling transponder in a manner as described hereinbefore for the loading process.

As the system is fully symmetrical, it is possible, is desirable in certain situations, for the interrogator and the labeling transponders to be interchanged in position and/or for a plurality of interrogators to be used.

I claim:

1. A system for checking the loading and unloading of tankers, comprising:
    a plurality of compartments adapted to be loaded and unloaded with fluent material;
    first grounding means to ground said plurality of compartments;
    a valve system for selecting one of said plurality of compartments and displaying the selected compartment;
    hose means having an electrical conductor;

first connecting means for electrically connecting said valve system to one end of said hose means;

a plurality of storage tanks adapted to be loaded and unloaded;

a plurality of pipes each connected to a respective one of said plurality of storage tanks;

second grounding means to ground each of said plurality of pipes;

a plurality of second connecting means each connected to a respective one of said plurality of pipes, a closed loop electrical circuit being created from ground through said plurality of compartments, first connecting means, hose means, one of said plurality of second connecting means, a respective one of said plurality of pipes and back to ground upon connection of one of said plurality of second connecting means to said hose means;

interrogator means, inductively coupled to said first connecting means, for generating an interrogation field and having indicator means for indicating to a user which storage tank is connected; and a plurality of responders each inductively coupled to a respective one of said plurality of pipes, each having detection means for detecting the presence of said interrogation field and means responsive to detecting the presence of said interrogation field to send an identification signal through said closed loop electrical circuit, wherein said interrogator means receives said identification signal from a respective one of said plurality of responders inductively coupled to said electrical circuit and said indicating means produces an indicating signal identifying the one of said plurality of pipes connected to said electrical circuit.

2. An identification system as claimed in claim 1, further comprising:

first inductive coupling means for coupling said interrogator means to said first connecting means; and a plurality of second inductive coupling means each for coupling a respective one of said plurality of responders to a respective one of said plurality of pipes characterized in that at least one of the first and plurality of second inductive coupling means is formed by a toroidal coil placed around the first connecting means and each of said plurality of pipes, respectively.

3. An identification system as claimed in claim 2, characterized in that at least one of the first and plurality of second inductive coupling means is formed by an electrical interruption in the first connecting means and plurality of pipes, respectively, bridged by windings of low impedance for low-frequency currents and D.C. current, and an antenna coil connected to one of the interrogator means and a respective one of the responder means in inductive relation to said low impedance windings.

4. In combination with a system for identifying one of a plurality of storage tanks adapted to be loaded and unloaded with fluent material conducted through an elongated hose having opposite ends in which one of a plurality of first electrically conductive couplings is connected to a first end of said hose and a second electrically conductive coupling is connected to a second end of said hose, with said plurality of first couplings adapted to be connected to respective ones of said plurality of storage tanks through a respective one of a plurality of pipes, said system having an interrogator electromagnetically producing an interrogation field and a plurality of responders each connected to respective ones of said plurality of pipes wherein said responder generates a coded signal in response to detection of said interrogation field, a method of checking the identity of said plurality of storage tanks prior to loading or unloading thereof, comprising the steps of:

electrically grounding said plurality of storage tanks and said second coupling at respective ends of the hose;

establishing a closed loop circuit through said hose between one of said plurality of storage tanks and the second coupling to dissipate electrostatic charges;

inductively coupling the interrogator to said second coupling for transmission of said interrogation field from the interrogator to one of said plurality of responders and inductively coupling said one of said plurality of responders to a respective one of said plurality of pipes in response to receipt of said interrogation field for transmission of the coded signal along said closed loop circuit through the hose to said interrogator; and reading the transmitted coded signal indicated by said interrogator to identify the responder corresponding to the one of said plurality of storage tanks connected through said respective one of said plurality of pipes and first electrically conductive couplings to said hose.

5. The method as claimed in claim 4, wherein the second coupling is connected to a plurality of second tanks of a tanker vehicle.

* * * * *